United States Patent [19]

Espiritu-Santo

[11] Patent Number: 4,872,349

[45] Date of Patent: Oct. 10, 1989

[54] MICROCOMPUTERIZED FORCE TRANSDUCER

[75] Inventor: Eugenio Espiritu-Santo, Fairfield, Ohio

[73] Assignee: General Electric Company, Cincinnati, Ohio

[21] Appl. No.: 925,339

[22] Filed: Oct. 31, 1986

[51] Int. Cl.⁴ .............................. G01L 7/08; G01L 9/06
[52] U.S. Cl. ........................................ 73/727; 73/115; 73/708; 73/754
[58] Field of Search ............... 73/179, 115, 178 R, 73/116, 178 H, 178 T, 708, 711, 717, 718, 719, 720, 721, 722, 723, 724, 725, 726, 727, 728, 753, 754, 770; 307/296 A

[56] References Cited

U.S. PATENT DOCUMENTS

| | | | |
|---|---|---|---|
| 4,434,664 | 3/1984 | Antonazzi | 73/701 |
| 4,457,179 | 7/1984 | Antonazzi et al. | 73/701 |
| 4,539,843 | 9/1985 | Wise | 73/179 |

OTHER PUBLICATIONS

Stein, "Pulsing Strain-Gage Circuits", Instruments & Control Systems, vol. 38, pp. 128–134, 2-1965.

Primary Examiner—Donald O. Woodiel
Attorney, Agent, or Firm—Derek P. Lawrence; Nathan D. Herkamp

[57] ABSTRACT

An apparatus for measuring force has a resistive element which has an electrical resistance which varies as a function of force applied to the transducer. An electrical output signal related to the resistance of the element has a sufficient magnitude so that it can be fed directly to processing circuitry without any amplification. This is accomplished by modulating the electrical power supplied to the resistive element to enhance the electrical output signal.

14 Claims, 5 Drawing Sheets

PREVIOUS PRESSURE TRANSDUCER SUBSYSTEM

'SMART' PRESSURE TRANSDUCER SUBSYSTEM

MICROCOMPUTERIZED FORCE TRANSDUCER

FIELD OF THE INVENTION

The invention of this application relates to force transducers. More specifically, the invention of this application relates to force transducers having enhanced output signals.

BACKGROUND OF THE INVENTION

Various kinds of force may be measured by subjecting certain kinds of resistive elements to that force. Those resistive elements have an electrical resistance which varies as a function of the applied force. Examples of such resistive elements are strain gauges and piezoresistive elements. The resistance of the element may be determined, and thus the force may be measured, by applying electrical power to the resistive element and monitoring an electrical output signal related to the power dissipated in the resistive element, for example, a signal related to the voltage across the resistive element or the current flowing in the resistive element. The magnitude of the electrical output signal is related to the amount of power supplied to the resistive element. In the past, the magnitude of the electrical output signal has been inadequate for direct connection of that signal to processing circuitry usually associated with force transducers, for example, a microcomputer or other computer circuitry.

Accordingly, it has been proposed that a signal related to the voltage across the resistive element or the current flowing in the element be amplified before it is applied to the processing circuitry. This is unsatisfactory for several reasons. Amplifiers add to circuit complexity making the transducers prone to failure. Amplifiers take up needed space, which make designing a compact transducer difficult. Amplifiers have a tendency to drift which would render the force measurement inaccurate over time if the drift were not taken into account. Taking drift into account adds more unneeded complexity to the circuit design. Amplifiers also may add various forms of undesirable instability to the circuitry making force measurement difficult or impossible. Amplifiers are prone to electrical noise and are influenced by electromagnetic radiation, particularly if the amplifiers are situated on a circuit board outside the transducer. Amplifiers are thus not an attractive solution to the problems associated with low output signal levels from resistive force transducers.

A need, therefore, exists to provide adequate output signal levels from resistive force transducers without introducing the problems associated with signal amplification. It thus is one object of the invention to provide a transducer apparatus for measuring force applied to the transducer apparatus without the need for amplifying an electrical output signal produced by the transducer, such electrical output signal having a sufficient magnitude so that it can be directly applied to processing circuitry associated with the transducer apparatus. Additional objects of the invention are apparent from the advantages of the invention described in the detailed description below.

SUMMARY OF THE INVENTION

One embodiment of the invention of this application comprises a transducer apparatus having a means for producing an electrical output signal related to force. It also comprises a means for supplying electrical power to the means for producing the output signal and a means for modulating the power supplied to the producing means. A sampling means is synchronized with the modulation of the power supplying means so that the electrical output signal is sampled in synchronism with the modulation.

DETAILED DESCRIPTION OF THE INVENTION

Figure 1:
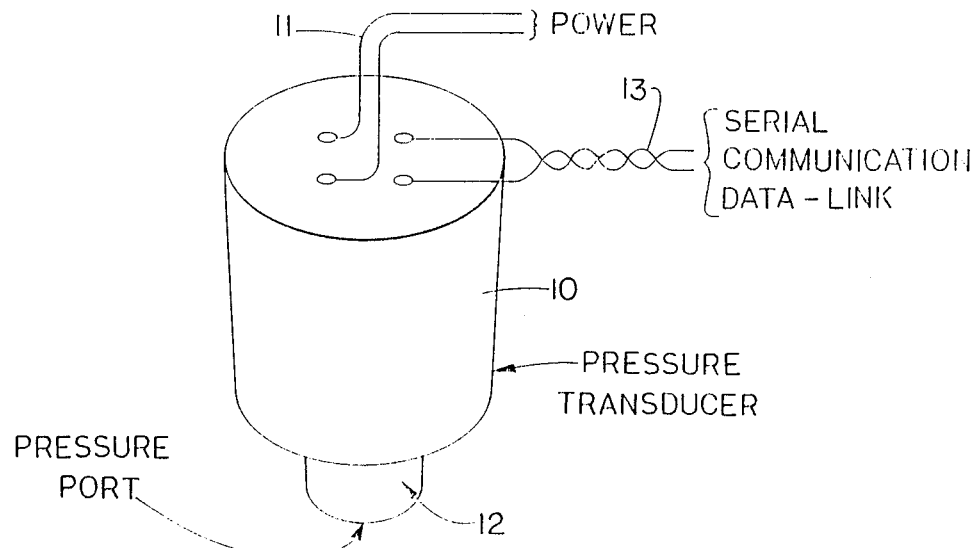
FIG. 1 shows schematically an example of a pressure transducer in accordance with the invention.
Figure 2:
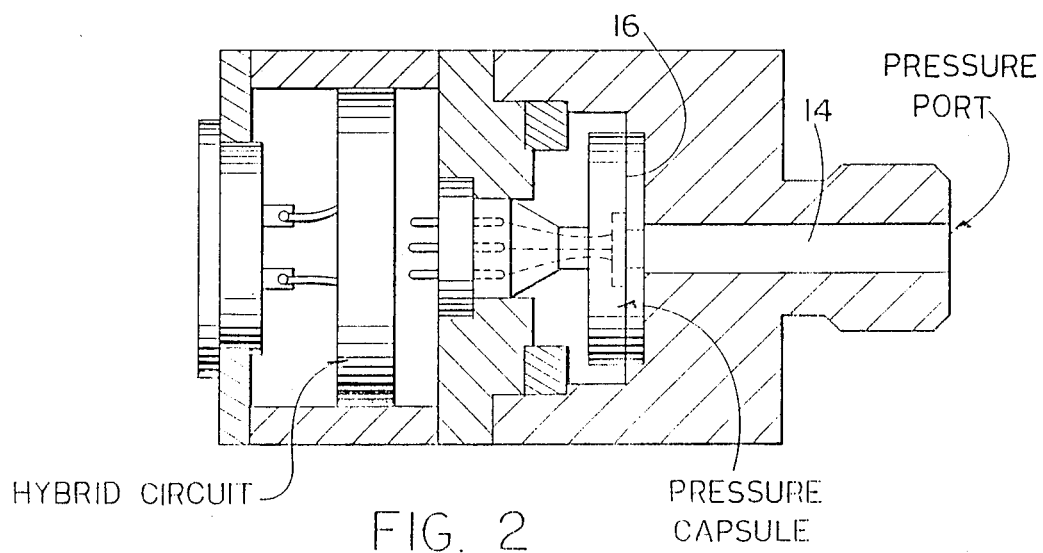
FIG. 2 shows a more detailed sectional side view of the transducer of FIG. 1.

FIGS. 1 and 2 show a pressure transducer which is an example of a force transducer in accordance with the invention of this application. Such pressure transducers are useful in measuring fluid pressures in an aircraft engine. Those fluid pressures include static and dynamic air pressures, such as those measured to ascertain the Mach number of fluid flowing through the engine and a compressor pressure ratio. The pressures that may be measured also include augmentor pressures and fan pressures. Absolute or differential pressures may be measured. The signals produced by the pressure transducers may be used to implement various control strategies for the engine which are not a part of the invention of this application.

The pressure transducer comprises a cylindrical pressure housing 10 which contains a pressure capsule having a pressure sensitive element and which also contains electrical processing circuitry described below. Direct current electrical power is supplied to the transducer on lines 11. The transducer supplies electrical signals, such as digital serial data signals related to pressure, to an external processor, for example, to a host computer, over a serial communications data link 13 which may be a two wire twisted pair data link. The external processor not only receives data signals from the transducer but also controls the operation of processing circuitry in the housing over the data link 13. More than one transducer may be connected to, and may be controlled by, the external processing circuitry through the data link 13.

A cylindrical pressure port 12 is located at one end of the housing. The pressure port communicates through a cylindrical passage 14 with a cylindrical diaphragm 16 in the pressure capsule. The diaphragm deforms in response to fluid pressure communicated to the diaphragm 16 through passage 14. Fixed to the diaphragm are one or more resistive elements which have an electrical resistances which vary with deformation of the resistive elements. Thus, the electrical resistances of the resistive elements vary with pressure applied to the diaphragm. One or more resistive elements, the resistances of which vary with temperature, are also fixed to the diaphragm.

The pressure sensing element may be a quartz diaphragm that has an epitaxially grown silicon layer on one surface. The silicon layer is etched to result in four stress sensitive resistive elements and four temperature sensitive resistive elements on the diaphragm. Two of the stress sensitive resistive elements are oriented so that an increase in stress causes an increase in resistance of the elements. The other two stress sensitive resistive elements are oriented at a 90 degree angle with respect to the first two stress sensitive elements so that an increase in stress causes a decrease in resistance of the elements. The four stress sensitive resistive elements may be connected in a Wheatstone bridge circuit so that they give an electrical output signal related to diaphragm stress and hence to fluid pressure applied to the diaphragm. The temperature sensitive resistive elements furnish an electrical signal related to the temperature of the diaphragm.

Although a specific form of transducer is described above, the pressure sensitive element in the capsule may be any form of resistive force transducer having good repeatability and negligible hysteresis. It may be a strain gauge transducer or a transducer having a force sensitive semiconductor element such as a piezoresistive element. Such piezoresistive transducers may be obtained, for example, from CEC Transamerica Delaval.

In order to ascertain the force applied to the transducer, electrical power must be applied to the transducer. The electrical resistance of the transducer varies with the applied force. The resistance of the transducer may be ascertained by a variety of methods, including producing and sensing the magnitudes of electrical output signals related to the electrical power dissipated in the transducer, for example, the electrical voltage across portions of the transducer or the electrical current flowing through portions of the transducer.

The resistive elements on the diaphragm in FIG. 2 are connected to processing circuitry which may be a hybrid circuit located in or about the pressure capsule. The hybrid circuit includes a microcomputer, having a microprocessor for computing the force on the transducer, among other things, a read only memory (ROM) storing routines for checking the performance of the transducer and for calibrating the transducer, and an electrically eraseable programmable read only memory (EEPROM) storing transducer characterization data. It also includes filtering circuitry analog to digital conversion circuitry, buffer circuits, transducer address setting circuitry, and serial data communications circuitry.

In the past, continuous DC power has been supplied to the resistive elements of force transducers. Those resistive elements, however, are able to dissipate a limited amount of electrical power. For example, the voltage applied across the resistive elements by a DC power supply is limited. This limits the magnitude of any electrical output signal indicating applied force which may be produced by the transducer. The electrical output signals from transducers used in the past and supplied with continuous DC power are too small to be applied directly without amplification to processing circuitry such as microcomputer circuitry. It thus has been proposed to amplify the electrical signals before they are applied to transducer processing circuitry.

Figure 3:
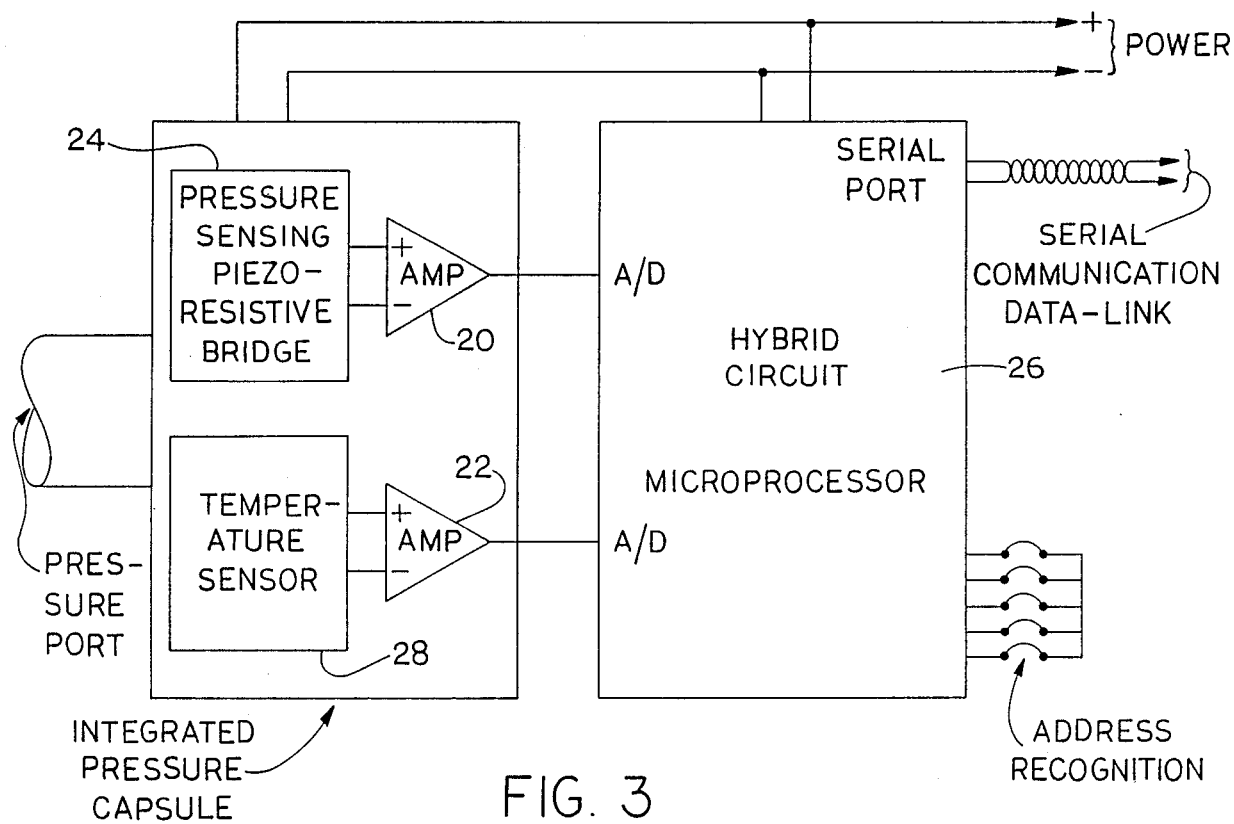
FIG. 3 is a schematic circuit diagram of an example of a pressure transducer requiring amplification of the output signal produced by the transducer before application of that signal to processing circuitry associated with the transducer.

One example of such an arrangement is shown in FIG. 3, which shows an amplifier 20 connected between the output of a pressure sensing piezoresistive bridge 24 and a first analog to digital conversion port in a microprocessor 26 outside a pressure capsule. FIG. 3 also shows an amplifier 22 connecting the output of a resistive temperature sensor 28 to another analog to digital conversion port in the microprocessor 26. The amplifiers 20 and 22 may be NMOS operational amplifiers integral with the force sensing diaphragm. The gains of the amplifiers are set to boost the outputs of the pressure and temperature sensors enough so that they are large enough to be used by the microprocessor. As discussed above, it is advantageous to eliminate the need for such amplifiers.

Figure 4:
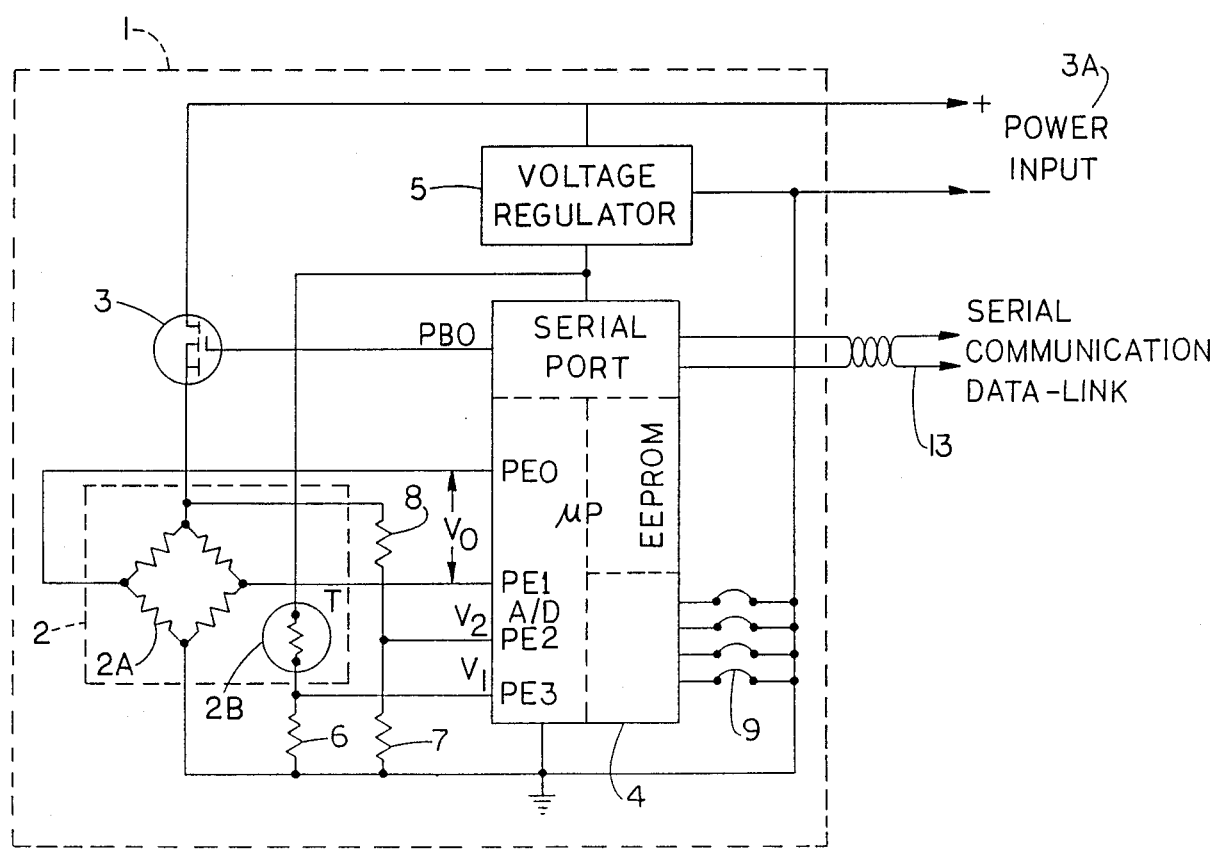
FIG. 4 is a schematic circuit diagram of an example of a pressure transducer in accordance with the invention of this application.

FIG. 4 shows an electrical schematic diagram of an apparatus which has no need of such amplifiers. Amplification of the signals from the resistive elements shown in FIG. 4 is not needed because the electrical power supplied to the resistive elements is modulated so that the output of the resistive elements is enhanced. Processing circuitry samples the signals from the resistive elements in synchronism with the modulation and computes the force applied to the transducer.

In a preferred form of the invention, an intermittent method of measuring force under the control of a microprocessor is used. The microprocessor, which is part of a microcomputer, controls a relatively high DC voltage across a resistive bridge force transducer. Electrical power in the form of such high voltage is supplied to the bridge for short periods of time allowing large amounts of current to flow in the bridge. Accordingly, a relatively large electrical output signal in the form of an output voltage from the bridge is produced repetitively and for short periods of time. The electrical output signal is sampled by the microcomputer during those short periods of time. Amplification of such signal is unnecessary.

The microcomputer, not only measures the electrical signal from the bridge, but also measures signals related to the temperature in the pressure transducer and the excitation voltage of the bridge. Those signals, which are not necessarily linear functions of the parameters to be measured, are used by the microprocessor to compute the actual pressure on the transducer in light of characterization data stored in the microcomputer. It is preferred that an electrical signal proportional to such pressure be produced by the microprocessor. That signal may be transmitted to another processor external to the transducer through a serial output port of the microprocessor.

FIG. 4 shows in phantom at reference numeral 1 the outline of the pressure transducer housing 10 shown in FIGS. 1 and 2. It also shows a schematic diagram of the hybrid circuitry in the housing which is referred to above in connection with the description of FIG. 2. The circuitry comprises a resistive Wheatstone bridge force sensing element 2A located on diaphragm 2 which may be constructed as described above. The source and drain electrodes of a power MOSFET 3 are connected in series with the force sensing element 2A. The force sensing element 2A and MOSFET 3 are connected in series with a DC power supply 3A. The gate of the MOSFET 3 is connected to port PB0 of a microcomputer 4.

The power supply 3A is connected in series with a voltage regulator 5 which supplies regulated DC supply voltage to power the microcomputer 4. The regulated DC supply voltage from the regulator 5 also is connected in series with a voltage divider consisting of a series combination of a temperature sensitive resistor 2B located on diaphragm 2 and a current to voltage converter resistor 6.

The output voltage $V_0$ across one diagonal of the bridge, which varies with the resistance of the bridge and thus with the force applied to the transducer, is connected to the PE0 and PE1 ports of the microcomputer. The excitation voltage across the other diagonal of the bridge is reduced by a voltage divider comprising of a series combination of dropping resistors 7 and 8. The junction of resistors 7 and 8 is at a voltage $V_2$ which is related to the magnitude of the excitation of the bridge and is connected to the PE2 port in the microcomputer.

The voltage $V_1$ at the junction of resistors 2B and 6 is connected to the PE3 port of the microcomputer and indicates to the microcomputer the temperature of the force sensing diaphragm. This temperature must be known because the force applied to the diaphragm is a function not only of the output and excitation voltages of the bridge, but also of the temperature of the bridge. The temperature is used by the microcomputer, along with the bridge excitation and output voltages and characterization data stored in the microcomputer's EEPROM comprising coefficients related to transducer linearity, zero offset, and span, to compute the pressure applied to the transducer.

The transducer of FIG. 4 may be used in a multiple transducer arrangement controlled by a single host computer. Accordingly, a bank of switches 9 is connected to the microcomputer, the setting of those switches giving each transducer a unique identifying address to allow the host computer to selectively communicate with the individual transducers over a single serial communications data link 13. Multiple transducer arrangements of this sort are particularly useful in measuring fluid pressures in an aircraft engine, the values of which are used by the host computer to control the engine.

The microcomputer 4 has an analog to digital converter which samples and converts the analog voltages connected to ports PE0-PE3 to digital representations of those voltages suitable for use by the microprocessor in computing pressure. The microcomputer 4 also has a ROM which stores a software routine, represented by the flow chart shown in FIG. 9, which checks and calibrates the transducer at start up or whenever demanded by a host computer or other piece of "smart" test equipment 30 as illustrated schematically in FIG. 8. The microcomputer also has a serial port shown in FIG. 4 connected to the serial data communications link 13.

The microcomputer may be any commercially available microcomputer, for example, a Motorola Part No. MC68HC11A8. Such microcomputer is a single chip device having on-chip peripheral functions, 8 kbytes of ROM, 512 kbytes of EEPROM, an enhanced NRZ Serial Communications Interface, and an 8-channel, 8-bit A/D converter.

The temperature sensitive resistor 2B may be any commercially available resistor of that nature, for example, an Analog Devices Part No. AD590. The MOSFET 3 is a typical low $R_{DS}$ device such as those obtainable from Siliconix, Inc.

Figure 5:
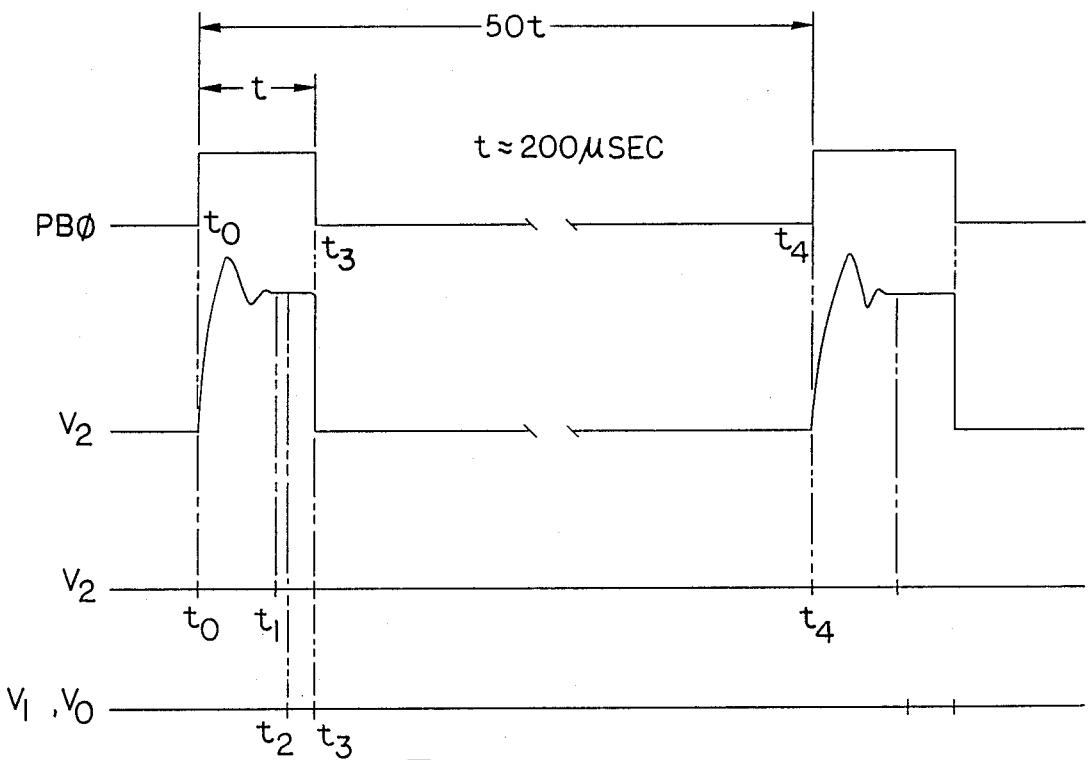
FIG. 5 is a diagram showing some of the voltages in the circuit of FIG. 4 as a function of time.

The circuit of FIG. 4 operates as follows and as illustrated in FIG. 5. The microcomputer turns on switch 3 at time $t_0$ powering resistive bridge sensing element 2A and voltage divider resistor network 7 and 8. Voltage on the bridge is monitored from $t_0$ to $t_1$ until the voltage stabilizes or becomes substantially constant at $t_1$. Then from $t_1$ to $t_2$ there is a small delay before the voltages from the Wheatstone bridge and the temperature sensitive resistor are measured. From $t_2$ to $t_3$, the bridge output voltage signal $V_0$, the temperature output signal $V_1$, and the bridge excitation signal $V_2$ are measured. At $t_3$, switch 3 is turned off and from $t_3$ to $t_4$ the pressure is computed. At $t_4$, the process described above is repeated.

The voltages in the circuit of FIG. 4 are sampled by an analog to digital converter in the microcomputer. Resistor 6 acts as a current to voltage converter for measuring temperature. Resistor network 7 and 8 reduces the voltage supplied by the bridge to the microcomputer such that it can be used by the microcomputer. The microcomputer may update pressure data typically every ten milliseconds, but this can be faster if inductive and capacitive effects of the resistive bridge element are minimized. Pressure data is provided via serial port at any time when requested by an external host computer or the data can be provided in a free-running mode via the serial port.

To compute pressure, the microcomputer reads the values of the $V_0$, $V_1$, and $V_2$ voltages and then the microprocessor in the microcomputer applies these values to a characterization routine stored in the microcomputer's memory, which produces a signal related to pressure. More specifically, the analog to digital converter in the microcomputer samples and digitizes the output, excitation, and temperature signals from the pressure transducer. The microprocessor linearizes the output signal from the transducer via a third order polynomial curve and corrects the output signal for zero offset and span using linearization and error correction coefficients of which are stored in the EEPROM. The calculated pressure is stored in memory and updated at approximately 10 msec intervals. This stored data may be transmitted via the serial port at request of a host computer, using a known master/slave serial communications protocol. In such a protocol, the host computer (the master) addresses and transmits a message to the transducers (the slaves) that triggers transmission of the desired data.

Such an operation can be readily implemented as a computer program in a commercially available microcomputer, such as the one mentioned above, using the instruction sets associated with such microcomputers. Because the specific computer program is not critical to the successful carrying out of the invention of this application, no program is given in this application. The sequence of operations of the circuit of FIG. 4 described above is a flow chart of such program sufficient to enable one skilled in the computer programming art and the force measurement art to make and use the invention of this application and to apprise those persons of Applicant's best mode of carrying out that invention. Such sequence of operation also permit such persons to design hardware implementations of the invention of this application.

A specific example of the improved signal levels achieved with the invention of this application is as follows. Some commercially available resistive force transducers are rated at about 120 ohms of resistance and a maximum power dissipation of about 1.875 watts. This means that the maximum continuous DC voltage which may be applied across the transducer is about 15 volts. The output voltage of the transducer, which is related to the force on the transducer, thus is limited to a certain value. If the invention of this application were used, that is, if the voltage across the transducer were modulated as described above, the maximum voltage which could be applied to the transducer would be increased because the increased voltage is not continuously connected to the transducer. The power dissipation due to the intermittently applied higher voltage would be reduced as compared with the situation in which such higher voltage is applied continuously. In other words, even though the voltage across the transducer is increased beyond its maximum continuous rating, the power dissipation through the transducer is maintained at safe levels because the higher voltage is not connected to the transducer at all times.

In the case described above, if a voltage of 100 volts were to be applied continuously to the transducer, the transducer would have to dissipate 83.3 watts, far beyond its capabilities. If the 100 volt source were connected to the transducer for 200 microseconds every 10 milliseconds (a duty cycle of 1/50), then the transducer would have to dissipate only about 1.66 watts, well-below its rating. The output voltage signal produced by the transducer for use by the microcomputer would be increased, however, because of the increased excitation of the transducer. The output voltage signal may be increased enough to avoid the use amplifiers between the transducer and its associated processing circuitry.

A transducer in accordance with the invention of this application may be made for measuring pressures in an aircraft engine or in other aerospace apparatus requiring accurate pressure measurement. Such transducers may be on the order of 1.0 inch in diameter and 1.50 inches long. They may have pressure sensors which measure pressure from 0–100 psi or from 1–800 psi. They may measure differential and absolute pressures to an accuracy of 0.2% of full scale pressure at ambient temperatures of −55° C. to +125° C. The pressure data from such transducers is corrected for nonlinearities and compensated for changes in the temperature of the transducers. Such corrected and compensated pressure data may be converted to serial digital form. Such data from large groups of transducers may be transmitted to a host computer via a single two-wire, twisted-pair data link, which makes the transmitted data highly immune to distortion by noise.

Figure 6:
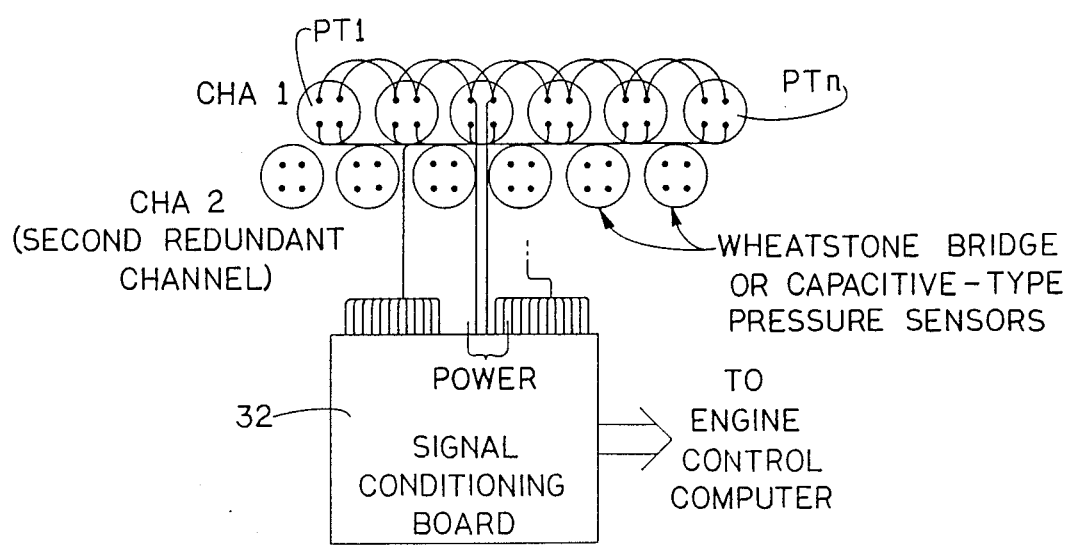
FIG. 6 is a schematic diagram of an aircraft engine subsystem containing a number of pressure transducers used in the past to measure a number of pressures in an aircraft engine.

Transducers in accordance with the invention will give major reductions in control system weight, complexity, and wiring needs. Prior aircraft engine systems group, for example, 16 to 32 transducers in a redundant subsystem having a common, remote signal conditioning board 32, as shown in FIG. 6. The circuitry on the board takes the raw analog pressure and temperature data from all of the transducers and computes the pressure signals to be sent to a host computer. Each of the new transducers in accordance with this invention, on the other hand, have this conditioning circuitry inside their housings, thus eliminating the need for a remote signal conditioning board and long wires connecting the remote board to the transducers. Reliability is improved and signal loss is reduced. See FIG. 7 which shows an example of a redundant transducer subsystem using pressure transducers in accordance with the invention of this application.

Figure 7:
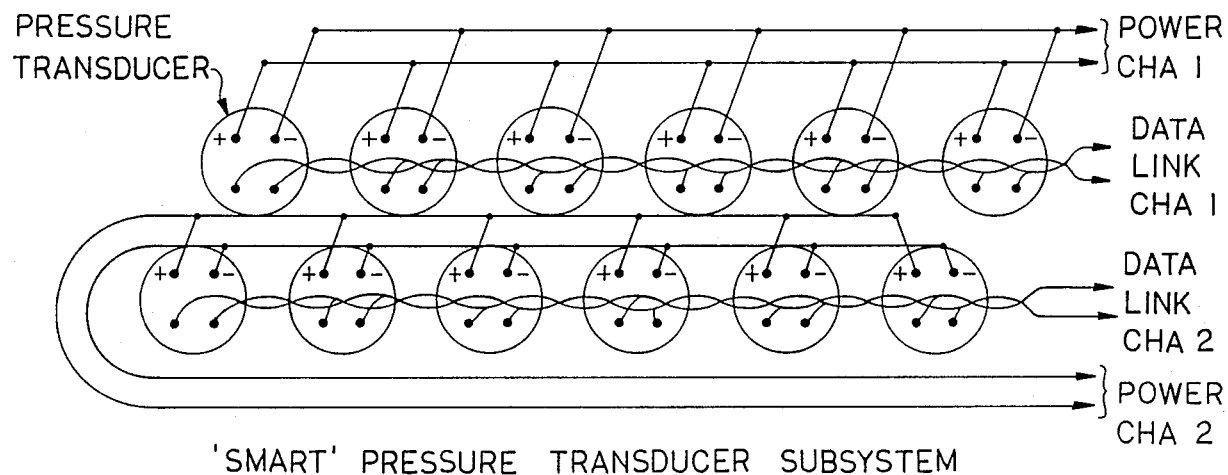
FIG. 7 is a schematic diagram of another aircraft engine subsystem containing a number of pressure transducers in accordance with the invention of this application for measuring pressures in an aircraft engine.

A simple communications protocol may be used to address each transducer when several of them share a common data-link as shown in FIG. 7. A binary coded address of each transducer is determined by the state of switches 9 in FIG. 4. Such address can be changed by changing the settings of those switches.

Some prior transducers also required manual trimming and correction for zero offset, span, and non-linearity before they are added to a transducer subsystem. The new transducer allows these time-consuming operations to be automated because each transducer has a microcomputer inside its housing. Such automation will reduce costs of the transducers and will allow simple plug-in transducer replacement.

The transducer may be incorporated in new generation jet engines to be built in the next few years. It may also be used in other computer-controlled aerospace systems, which have pressure sensing needs with similar accuracy, stability, and reliability requirements.

Figure 8:
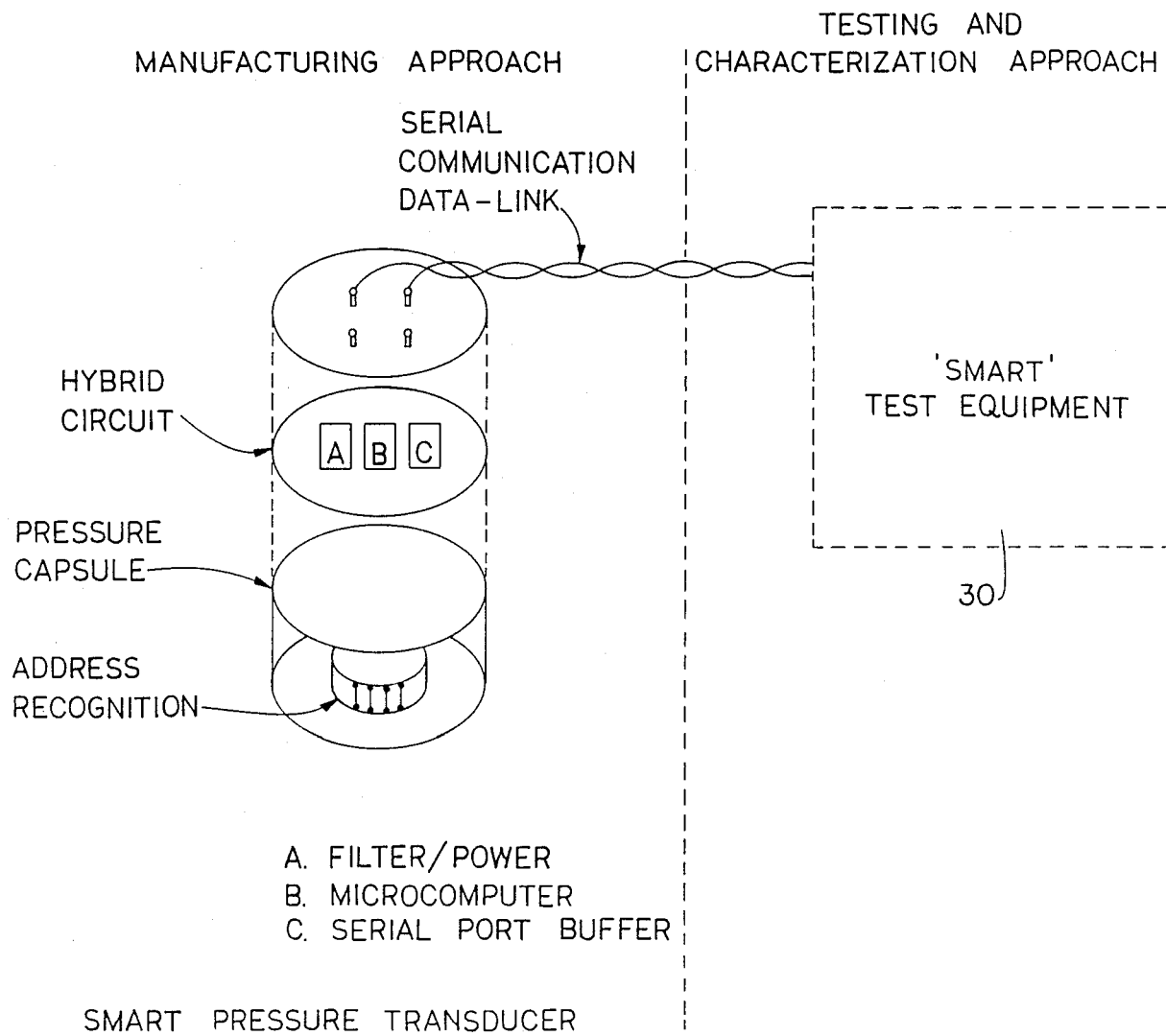
FIG. 8 is a schematic block diagram of circuitry used to characterize the transducer of FIG. 4.

The pressure transducers described in this application are characterized after final assembly using a "smart" piece of test equipment as shown in FIG. 8. This equipment applies multiple pressures to the transducer at −55° C. to +125° C. ambient temperatures. The raw pressure and temperature data from the transducer are read via a serial communications link. Coefficients for a third order polynomial curve fit, with pressure and temperatures as parameters, are then derived and stored in the EEPROM in the transducer's microcomputer. Error correction coefficients are derived for zero offset and span corrections. Once those coefficients have been stored in the EEPROM in the transducer's microcomputer, the transducer is ready for use.

If characterization has not been performed, the only output is raw pressure and temperature data. The characterization minimizes the effect of non-linearity on accuracy. If the basic sensor has good repeatability and negligible hysteresis, the output data will be accurate. The transducer is a true plug-in component, which can be changed without prior calibration of it or the subsystem to which it is added.

Figure 9:
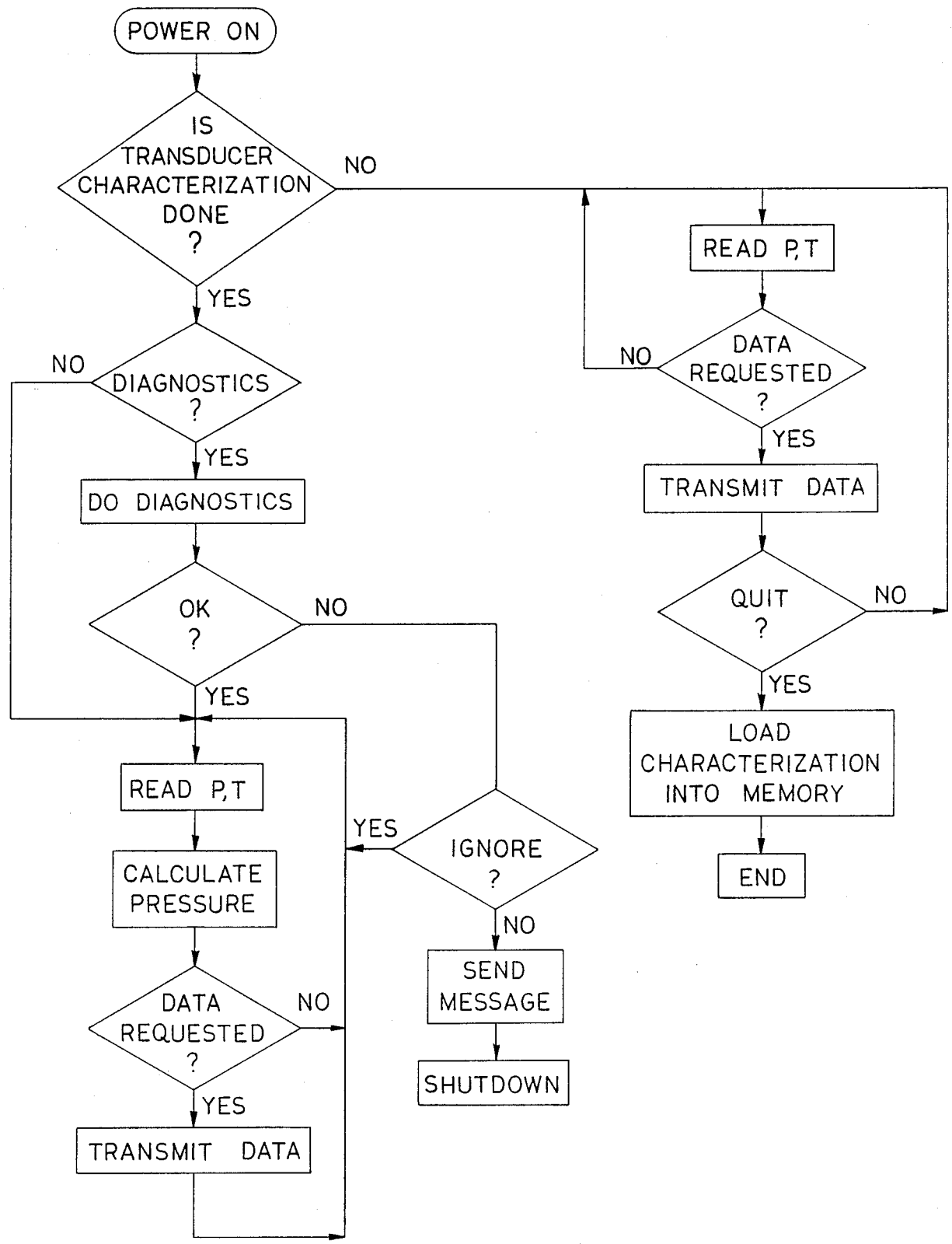
FIG. 9 is a flow chart representing self-diagnostic electronic circuitry in the microcomputer shown in FIG. 4 for carrying out calibration of the transducer.

A ROM in the microcomputer contains a software routine shown in FIG. 9 that initiates a self-diagnostic process when the transducer is powered up. If the transducer has been characterized, this algorithm permits the transducer to be recalibrated, if necessary, so that long term drift is eliminated.

As demonstrated above, the invention has many advantages. First, the transducer operates in an intermittent manner such that when a resistive force transducer is utilized, signal amplification will not be necessary. The bridge is powered with a high DC voltage for very short periods of time, which provides higher than normal output voltage signals. Second, signal conditioning is done on the transducer, making each one completely independent of external signal conditioning. Because the microcomputer in the transducer has an EEPROM storing the transducer's characterization data, replacement of the transducer may be done directly and without recalibration or other adjustments. Third, the transducer has a digital serial port which allows a group of transducers to be connected to a common data-link. The data-link is tied to the host computer and pressure data is transmitted simply by the host computer addressing the transducer from which the data is required.

What is claimed is:

1. A transducer apparatus, comprising:
   a means for producing an electrical output signal related to force;
   a means for supplying electrical power to the producing means;
   a switching means for modulating the power supplied to the producing means by the supplying means by repetitively connecting and disconnecting the supplying means to and from the producing means; and
   a means synchronized with the modulating means for sampling the electrical output signal related to force at a predetermined time during the time the modulating means connects the supplying means to the producing means.

2. The apparatus of claim 1, in which the electrical output signal is related to pressure.

3. The apparatus of claim 1, in which the electrical output signal is related to pressure in an aircraft engine.

4. The apparatus of claim 1, in which the predetermined time is a time after the modulating means connects the supplying means to the producing means such that the electrical output signal is substantially constant as a function of time.

5. The apparatus of claim 1, in which the producing means comprises a resistive element, the electrical resistance of which is a function of force applied to the resistive element.

6. The apparatus of claim 5, in which the resistive element comprises a piezoresistive element.

7. The apparatus of claim 5, in which the resistive element comprises a Wheatstone bridge.

8. The apparatus of claim 1, further comprising a housing enclosing the producing means, the modulating means, and the sampling means.

9. A plurality of transducer apparatus in accordance with claim 8, each of which is connected to one end of a serial data communications link, the other end of the serial data communications link being connected to a processing means external to the housings of the transducer apparatus.

10. An apparatus for measuring pressure, comprising:
    a resistive element, the electrical resistance of which varies as a function of pressure on the resistive element;
    a switching means connected in series with the resistive element;
    an electrical power supply means connected in series with the resistive element and the switching means; and
    a microcomputer connected to the switching means, comprising:
    means for connecting the power supply means to the resistive element for predetermined intervals;
    an analog to digital conversion means for sampling a voltage related to the electrical resistance of the resistive means during one or more of the predetermined intervals;
    an electrically eraseable read only memory storing coefficients relating to the linearity, zero offset, and span of the resistive element; and
    a microprocessor means responsive to the analog to digital conversion means and the electrically eraseable read only memory for computing the pressure on the resistive element.

11. The apparatus of claim 10, further comprising a housing enclosing the resistive element, the switching means, and the microcomputer.

12. A plurality of pressure measuring apparatus in accordance with claim 11, each of which is connected to one end of a serial data communications link, the other end of the serial data communications link being connected to a processor means external to the pressure measuring apparatus.

13. The apparatus of claim 10, in which the microcomputer further comprises a serial data communications port for transmitting the computed pressure to a processing means external to the pressure measuring apparatus.

14. The apparatus of claim 13, in which the microcomputer further comprises a read only memory containing a calibration routine for eliminating drift of the transducer.

* * * * *